United States Patent
Shibuya et al.

(10) Patent No.: US 12,307,201 B2
(45) Date of Patent: May 20, 2025

(54) ANALYSIS SYSTEM, ANALYSIS METHOD, AND RECORDING MEDIUM

(71) Applicant: NEC Corporation, Tokyo (JP)

(72) Inventors: Taizo Shibuya, Tokyo (JP); Kentaro Nishida, Tokyo (JP); Kiri Inayoshi, Tokyo (JP); Tomo Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 17/884,673

(22) Filed: Aug. 10, 2022

(65) Prior Publication Data

US 2023/0054146 A1 Feb. 23, 2023

(30) Foreign Application Priority Data

Aug. 20, 2021 (JP) .................. 2021-134603

(51) Int. Cl.
*G06F 40/242* (2020.01)
*G06F 40/284* (2020.01)

(52) U.S. Cl.
CPC .......... *G06F 40/242* (2020.01); *G06F 40/284* (2020.01)

(58) Field of Classification Search
CPC ...... G06F 40/242; G06F 40/10; G06F 40/131; G06F 40/157; G06F 40/20; G06F 40/205; G06F 40/268; G06F 40/284; G06F 40/289; G06F 40/30
USPC ...................... 704/10, 1, 3, 4, 7, 9, 257, 276
See application file for complete search history.

(56) References Cited

U.S. PATENT DOCUMENTS

| | | | | |
|---|---|---|---|---|
| 11,288,453 | B1* | 3/2022 | Vinicombe | G06F 40/284 |
| 2004/0037470 | A1* | 2/2004 | Simske | G06V 30/268 |
| | | | | 382/229 |
| 2018/0307680 | A1* | 10/2018 | Wu | G06F 16/3347 |

FOREIGN PATENT DOCUMENTS

JP 2016-164724 A 9/2016

OTHER PUBLICATIONS

Translation of CN-100454303-C (Year: 2009).*

* cited by examiner

*Primary Examiner* — Qi Han

(57) ABSTRACT

An analysis system is configured to include an extraction unit, an output unit, an acquisition unit, and a dictionary generation unit. The extraction unit extracts, as a token pair, two tokens that consecutively occur in a sentence separated using the basic dictionary. Regarding a token in which two tokens included in a token pair are connected, the output unit displays a selection screen for selecting any of registering with a dictionary, registering with an on-hold list for holding registration with the dictionary, and not registering with the dictionary. The acquisition unit acquires a selection result for the selection screen. The dictionary generation unit generates an on-hold list with which the token pair whose selection result indicates on-hold is registered as a token, and a dictionary with which the token pair whose selection result indicates registering is registered as a connected token.

12 Claims, 15 Drawing Sheets

Fig.9

| PROJECT NAME | LATEST LAP COUNT | PROCESSING STATUS | WORD CLOUD | | |
|---|---|---|---|---|---|
| AAAA | 2 | 5000/9000 | wc | HISTORY | NEW |
| BBBB | 1 | 150/15000 | wc | HISTORY | CONTINUED |
| CCCC | 8 | 8500/8500 | wc | HISTORY | CONTINUED |
| | | | | | COMPLETE |

ANALYSIS SYSTEM, ANALYSIS METHOD, AND RECORDING MEDIUM

This application is based upon and claims the benefit of priority from Japanese Patent Application No. 2021-134603, filed on Aug. 20, 2021, the disclosure of which is incorporated herein in its entirety by reference.

TECHNICAL FIELD

The present disclosure relates to a sentence analysis system and the like.

BACKGROUND ART

There is a case where by aggregating tokens included in a sentence, the time background, the social situation, or the market trend when the sentence is created is analyzed. A token is a meaningful unit of text, such as a word or a multi-word expression. In order to aggregate tokens included in a sentence, it is necessary to separate text data constituting the sentence into appropriate units. The processing of separating text data into appropriate units is performed by natural language processing using, for example, a dictionary with which token data is registered.

In order to appropriately analyze the time background or the like on the basis of the token extracted from the sentence, it is desirable to use a dictionary including many tokens in the field of the analysis target. However, since generation of the dictionary is performed by determining the presence or absence of registration with the dictionary token by token, a huge amount of work is required. Therefore, it is desirable to be able to easily generate a dictionary associated to the use, and for example, a technology of generating a dictionary such as Patent Literature 1 (JP2016-164724A) is disclosed.

When extracting a multi-word expression from text data, the device described in JP2016-164724A extracts and outputs, together with estimated related information, a multi-word expression not registered with an established dictionary.

In JP2016-164724A, by outputting related information for a multi-word expression not registered with the dictionary among multi-word expressions extracted from text data, information that serves as a reference when determining necessity of registration with a dictionary is presented. However, JP2016-164724A does not disclose a technology for connecting equal to or more than three words. Therefore, with the technology of JP2016-164724A, it is difficult to set a long multi-word expression as a unit for separating a sentence.

An object of the present disclosure is to provide an analysis system and the like that can easily generate a dictionary including a multi-word expression, or a token, in which equal to or more than three words are connected.

SUMMARY

An analysis system of the present disclosure includes: an extraction means configured to extract, as a token pair, two tokens that consecutively occur in a sentence separated by using a simple rule and a basic dictionary; an output means configured to output a selection screen for selecting, regarding a token in which two tokens included in the token pair are connected, any of registering with a dictionary, registering with an on-hold list for holding registration with the dictionary, and not registering with the dictionary; an acquisition means configured to acquire a selection result for the selection screen; and a dictionary generation means configured to generate an on-hold list with which the token pair whose selection result indicates on-hold is registered as a token, and the dictionary with which the token pair whose selection result indicates registering is registered as a token.

An analysis system of the present disclosure includes: extracting, as a token pair, two tokens that consecutively occur in a sentence separated by using a simple rule and a basic dictionary; outputting a selection screen for selecting, regarding a token in which two tokens included in the token pair are connected, any of registering with a dictionary, registering with an on-hold list for holding registration with the dictionary, and not registering with the dictionary; acquiring a selection result for the selection screen; and generating an on-hold list with which the token pair whose selection result indicates on-hold is registered as a token, and the dictionary with which the token pair whose selection result indicates registering is registered as a token.

A recording medium of the present disclosure non-transiently records an analysis program. An analysis program causes a computer to execute processing of extracting, as a token pair, two tokens that consecutively occur in a sentence separated by using a simple rule and a basic dictionary, processing of outputting a selection screen for selecting, regarding a token in which two tokens included in the token pair are connected, any of registering with a dictionary, registering with an on-hold list for holding registration with the dictionary, and not registering with the dictionary, processing of acquiring a selection result for the selection screen, and processing of generating an on-hold list with which the token pair whose selection result indicates on-hold is registered as a token, and the dictionary with which the token pair whose selection result indicates registering is registered as a token.

BRIEF DESCRIPTION OF THE DRAWINGS

Exemplary features and advantages of the present disclosure will become apparent from the following detailed description when taken with the accompanying drawings in which:

FIG. 9 is a view illustrating an example of the display screen of the first example embodiment;

EXEMPLARY EMBODIMENT

First Example Embodiment

Figure 1:
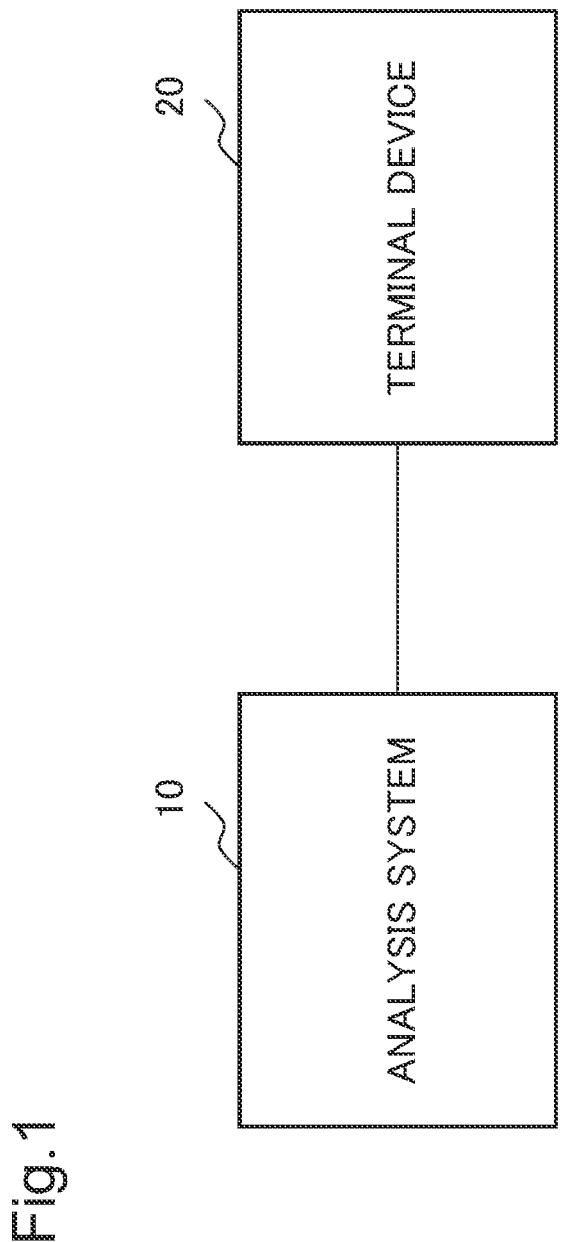
FIG. 1 is a view illustrating an outline of a configuration of a first example embodiment.

The first example embodiment of the present disclosure will be described in detail with reference to the drawings. FIG. 1 is a view illustrating an outline of the configuration of an information system of the present example embodiment. The information system of the present example embodiment includes an analysis system 10 and a terminal device 20. The analysis system 10 and the terminal device 20 are connected via a network.

The analysis system 10 of the information system of the present example embodiment is a system that divides text data of a sentence into tokens having a unit length suitable for analysis by natural language processing using a dictionary, and aggregates the number of occurrences of the divided tokens. Text data is also called a corpus. Dividing text data into tokens is also referred to as separating or tokenization. The analysis system 10 generates a dictionary for dividing a sentence into tokens having a length suitable for the purpose of the analysis of the sentence when analyzing the sentence, and analyzes the sentence using the generated dictionary.

The analysis system 10 sets an article of a magazine or a newspaper in a certain period, for example, as an analysis target, and outputs data of the number of occurrences of a token used in the article. The data of the number of occurrences of the token used in the article is used as data for analyzing the time background, the social situation, the market trend, the lifestyle, or the culture in the target period, for example, from the tendency of the token included in the article. As the sentence of the analysis target, for example, sentences included in a magazine, a newspaper, a book, a technical document, a report, public relations of an administrative agency, a patent publication, a law, a judgment, lyrics of a song, and a post on a web or a social networking service (SNS) are used. The purpose of the analysis and the document of the analysis target may be other than those described above.

The analysis system 10 extracts, as a token pair, consecutive tokens from a sentence used to generate a dictionary, and outputs a selection screen for selecting any of registering the token pair with the dictionary, not registering with the dictionary, and registering with an on-hold list. For example, when "peanut" and "butter" are consecutively present in a sentence, the analysis system 10 extracts "peanut butter", in which the two tokens are connected, as a token pair, and outputs a selection screen for selecting any of registering "peanut butter" as a token with the dictionary, not registering with the dictionary, and registering with the on-hold list. For the token pair whose selection result is registering with the dictionary, the analysis system 10 registers, with the dictionary, the token in which two tokens constituting the token pair are connected. In a case where registering with the on-hold list is selected, the analysis system 10 registers, with the on-hold list, the token in which two tokens constituting the token pair are connected. The on-hold list is a list with which a token pair not having meaning as a token in the current state but potentially making sense as a token when further connected with another token is registered.

The analysis system 10 confirms whether to complete generation of the dictionary in a case of ending confirmation of the presence or absence of registration with the dictionary for one round of token pairs extracted from the sentence, that is, all the extracted token pairs. In a case of continuing the generation of the dictionary, the analysis system 10 extracts again token pairs from the sentence using the simple rule, the basic dictionary, the generated dictionary, and the on-hold list, and performs confirmation processing of necessity of registration of the token pairs for the next round, that is, all the token pairs extracted from the sentence again. By repeating the round in this manner, a token newly registered with the dictionary becomes in a state where the number of connected tokens increases every round. The analysis system 10 generates a dictionary including a token in which equal to or more than three tokens are connected by repeating extraction of token pairs and confirmation of necessity of registration with the dictionary.

Figure 2:
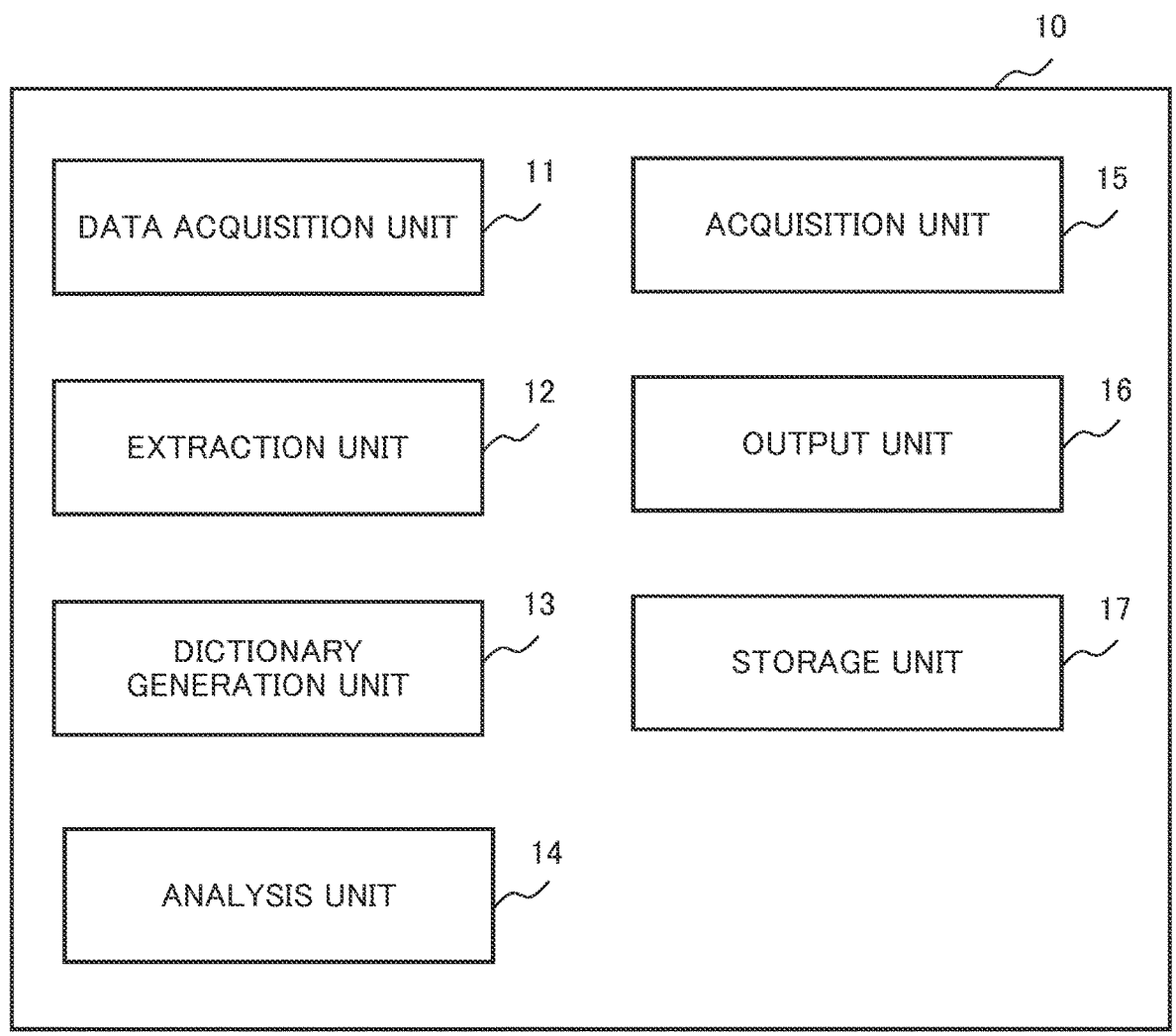
FIG. 2 is a view illustrating an example of a configuration of an analysis system of the first example embodiment.

The configuration of the analysis system 10 will be described. FIG. 2 is a view illustrating an example of the configuration of the analysis system 10. The analysis system 10 includes a data acquisition unit 11, an extraction unit 12, a dictionary generation unit 13, an analysis unit 14, an acquisition unit 15, an output unit 16, and a storage unit 17.

The data acquisition unit 11 acquires text data of a sentence used for generation of the dictionary and a sentence of the analysis target. For example, the same sentence is used as the sentence used for generation of the dictionary and the sentence of the analysis target. In a case where the sentence used for generation of the dictionary and the sentence of the analysis target are the same, it is possible to create the dictionary while confirming the number of times the token registered with the dictionary occurs in the sentence. In a case where a similar sentence is analyzed using the generated dictionary, the sentence that can be used for generation of the dictionary and the sentence of the analysis target may be different.

For example, the data acquisition unit 11 acquires, from the terminal device 20, text data for generating the dictionary and text data of the sentence of the analysis target, which are input to the terminal device 20 by an operator's operation. The data acquisition unit 11 may acquire text data of the sentence of the analysis target from another server via the network. Text data of the sentence may be directly input to the analysis system 10.

The extraction unit 12 separates the sentence into tokens by natural language processing. The extraction unit 12 extracts a token from a sentence by separating the sentence using a simple rule and the dictionary. The simple rule can be applied to a language such as English in which words are separated by spaces. In case of a language such as Japanese in which words are not explicitly separated in a sentence, the extraction unit 12 executes morphological analysis, for example, using MeCab, and separates the sentence into tokens. The extraction unit 12 extracts a token by separating the sentence using the simple rule and the basic dictionary, and extracts a token by separating the sentence using the simple rule and the basic dictionary, the generated dictionary, and the on-hold list as a dictionary in the second and subsequent rounds. In the on-hold list, only token pairs added to the on-hold list one round before are used as a dictionary. For example, when "scanning type tunneling microscope" is separated into "scanning", "type", "tunneling", and "microscope" in the first round, only "scanning" is used in the second round of separation and "scanning type tunneling" is used in the third round of separation. The basic dictionary is a dictionary used for a general field in morphological analysis. That is, the basic dictionary is a dictionary including tokens that become minimum units when separation is performed. The basic dictionary may be a dictionary in a specific field. Generation of a dictionary may be started using, as the basic dictionary, a dictionary already generated by the analysis system 10.

The extraction unit 12 further extracts, as a token pair, two consecutive tokens among the tokens extracted from the sentence. The extraction unit 12 generates, as a processing list, data in which a token pair is associated with the number of occurrences in a sentence for each token pair. A token pair in the first round is a combination of two tokens consecutively occurring in the sentence among the tokens registered with the basic dictionary. A token pair in the second and subsequent rounds is generated by further connecting a token existing before and after in the sentence to the token registered with the generated dictionary and the on-hold list. Only some of the extracted token pairs may be added to the processing list on the basis of a predetermined criterion. For example, a threshold of the occurrence frequency of a token pair may be set as a predetermined criterion, and only a token pair that occurs a certain number of times or more may be set as a processing target. Thus, it is possible to improve the efficiency of generation of the dictionary by narrowing down the token pair that is the processing target on the basis of the predetermined criterion.

The dictionary generation unit 13 confirms necessity of registration with the dictionary as a token regarding the token pair extracted by the extraction unit 12, and generates the dictionary with which the token pair is registered as a token on the basis of the confirmation result.

The dictionary generation unit 13 outputs, via the output unit 16 to the terminal device 20, a selection screen for selecting any of registering the token pair with the dictionary, not registering the token pair with the dictionary, and registering the token pair with the on-hold list. The dictionary generation unit 13 acquires, from the terminal device 20 via the acquisition unit 15, a selection result in which any of registering the token pair with the dictionary, not registering the token pair with the dictionary, and registering the token pair with the on-hold list is selected, and processes the token pair according to the selection result.

In a case where the selection result is registering with the dictionary, the dictionary generation unit 13 registers, with the dictionary, the token in which two tokens constituting the token pair are connected. In a case where the selection result is registering with the on-hold list, the dictionary generation unit 13 registers, with the on-hold list, the token in which two tokens constituting the token pair are connected. In a case where the selection result is not registering with the dictionary, the dictionary generation unit 13 proceeds to the processing of the next token pair without registering the token pair with either the dictionary or the on-hold list. The dictionary generation unit 13 may generate, as a non-registration list, a list with which a token pair whose selection result is not registering with the dictionary are registered, and use the generated non-registration list as a list of token pairs excluded from extraction as a token pair in the next round.

The dictionary generation unit 13 may register a part of speech in association with the token when registering a token pair with the dictionary as a token. The part of speech of each token is input by the operator, for example, via the terminal device 20. The part of speech of the tail token of the token pair may be used as the part of speech of the token to be registered with the dictionary. Information on the part of speech of the tail token of the token pair is associated with the token in the basic dictionary, for example.

The dictionary generation unit 13 may save a cost value in association with the token when registering the token pair as a token with the dictionary. The cost is an index used in morphological analysis to determine whether to connect the tokens together. The dictionary generation unit 13 sets the cost such that, for example, the larger the number of connected tokens is, the smaller the concatenation cost becomes. By setting the cost to become smaller as the number of connected tokens is larger, a longer token is preferentially extracted when tokens are extracted from the sentence by natural language processing.

Upon ending the confirmation necessity of registration and the processing based on the confirmation result for all the token pairs extracted by the extraction unit 12, the dictionary generation unit 13 outputs, via the output unit 16 to the terminal device 20, a selection screen for selecting any of completing the generation of the dictionary and continuing the generation of the dictionary. The dictionary generation unit 13 acquires, via the acquisition unit 15 from the terminal device 20, the selection result in which any of completing the generation of the dictionary and continuing the generation of the dictionary is selected. In a case where the selection result is completing the generation of the dictionary, the dictionary generation unit 13 completes the generation of the dictionary. In a case where the selection result is continuing the generation of the dictionary, the dictionary generation unit 13 requests the extraction unit 12 to extract a token pair using the simple rule, the basic dictionary, the dictionary generated until the completed round, and the on-hold list, and continues the generation of the dictionary in the next round.

The analysis unit 14 analyzes the sentence and generates display data for displaying, according to the number of occurrences in the sentence, the token included in the sentence. The analysis unit 14 extracts a token from the sentence using the dictionary generated by the dictionary generation unit 13. The sentence of the analysis target may be a sentence other than the sentence used for the generation of the dictionary prepared as the analysis target, or may be the sentence used for the generation of the dictionary.

The analysis unit 14 aggregates the number of occurrences of each token extracted from the sentence. The analysis unit 14 generates display data according to the aggregated number of occurrences. For example, the analysis unit 14 generates image data in which a token having a larger number of occurrences is displayed with larger characters at the center of the image. Such a method of outputting the tendency of the token included in the sentence by the image data in which a token having a larger number of occurrences is displayed with larger characters is also called a word cloud. The analysis unit 14 may aggregate an analysis result of the sentence using the occurrence frequency, the occurrence place, or the occurrence interval of the token in place of the number of occurrences of the token. The analysis unit 14 may aggregate the analysis result of the sentence using an item other than the above as an index.

The acquisition unit 15 acquires, from the terminal device 20, input data input to the terminal device 20 by the operator's operation. The acquisition unit 15 acquires, from the terminal device 20, a selection result input by the operator's operation on the selection screen for selecting any of registering the token pair with the dictionary, not registering the token pair with the dictionary, and registering the token pair with the on-hold list. The acquisition unit 15 acquires, from the terminal device 20, the selection result for selecting any of completing the generation of the dictionary and continuing the generation of the dictionary, the selection result input to the terminal device 20 by an operator's operation.

The output unit 16 outputs, to the terminal device 20, a selection screen for selecting any of registering the token pair with the dictionary, not registering with the dictionary, and registering with an on-hold list. When outputting the selection screen, the output unit 16 may output it including data of an example sentence indicating how the token pair is used in the sentence. When the output of the selection screen ends for all the token pairs extracted by the extraction unit 12 and the processing of one cycle ends, the output unit 16 outputs, to the terminal device 20, a selection screen for selecting any of completing the generation of the dictionary and starting the dictionary generation in the next round. The output unit 16 outputs the display data of the analysis result of the sentence of the analysis target to the terminal device 20. The output unit 16 may output the display data of each screen to a display device connected to the analysis system 10.

The storage unit 17 saves, as a processing list, information on the token and the token pair extracted from the sentence. The storage unit 17 saves the token and the token pair in association with the text data of the sentence of the number of occurrences and the occurrence place. The text data of the occurrence place of the token and the token pair is used for display of examples of the token and the token pair. The storage unit 17 saves data of the basic dictionary, the generated dictionary, and the on-hold list.

Each processing in the analysis system 10 may be performed in a plurality of information processing devices connected via the network. For example, the generation processing of the dictionary in the extraction unit 12 and the dictionary generation unit 13 and the analysis processing of the sentence in the extraction unit 12 and the analysis unit 14 may be performed in another information processing device. In a case of such configuration, the data acquisition unit 11, the acquisition unit 15, the output unit 16, and the storage unit 17 are included in each information processing device.

The terminal device 20 acquires, from the analysis system 10, data of the selection screen for selecting any of registering the token pair with the dictionary, not registering with the dictionary, and registering with an on-hold list. The terminal device acquires, from the analysis system 10, data of a selection screen for selecting any of completing the generation of the dictionary and continuing the generation of the dictionary. The terminal device 20 displays, on a display device (not illustrated), the data of the selection screen having been acquired. The terminal device 20 displays the data of the example sentence on the display device when the data of the selection screen includes data of the example sentence indicating how the token pair is used in the sentence. The terminal device 20 acquires the display data of the analysis result of the sentence from the analysis system 10, and displays the acquired display data on the display device.

The terminal device 20 receives input of the selection result input by the operator's operation on the selection screen. The terminal device 20 outputs the input data of the selection result to the analysis system 10.

The terminal device 20 includes, for example, a mouse, a keyboard, a touchscreen type display, a pen type input device, or a voice input device. The terminal device 20 may include an input device other than the above. The terminal device 20 may include a plurality of input devices.

As the terminal device 20, for example, a personal computer, a smartphone, or a tablet computer can be used. As the terminal device 20, an information terminal device other than the above may be used.

Figure 3:
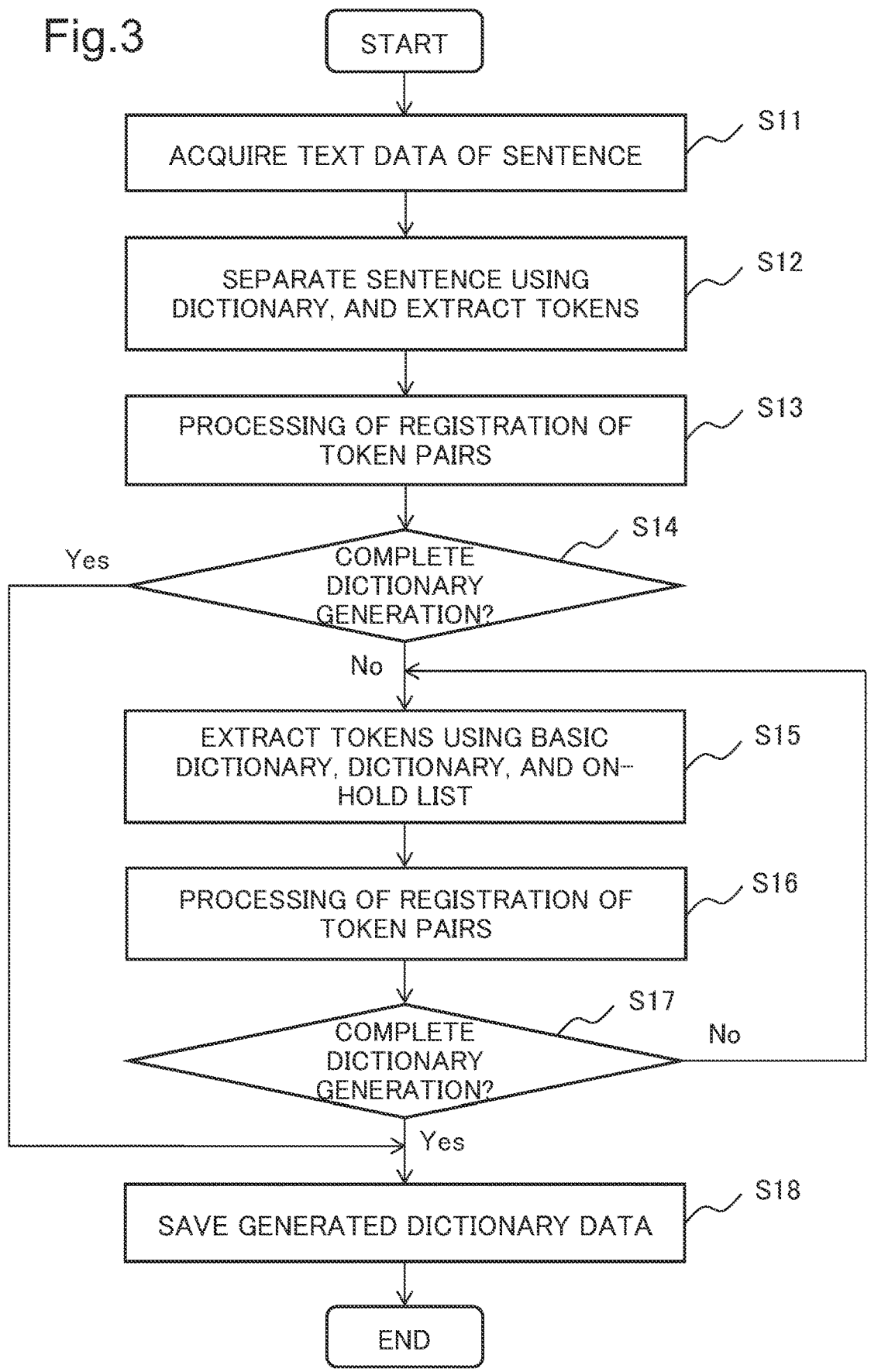
FIG. 3 is a view illustrating an example of an operation flow of the analysis system of the first example embodiment.
Figure 4:
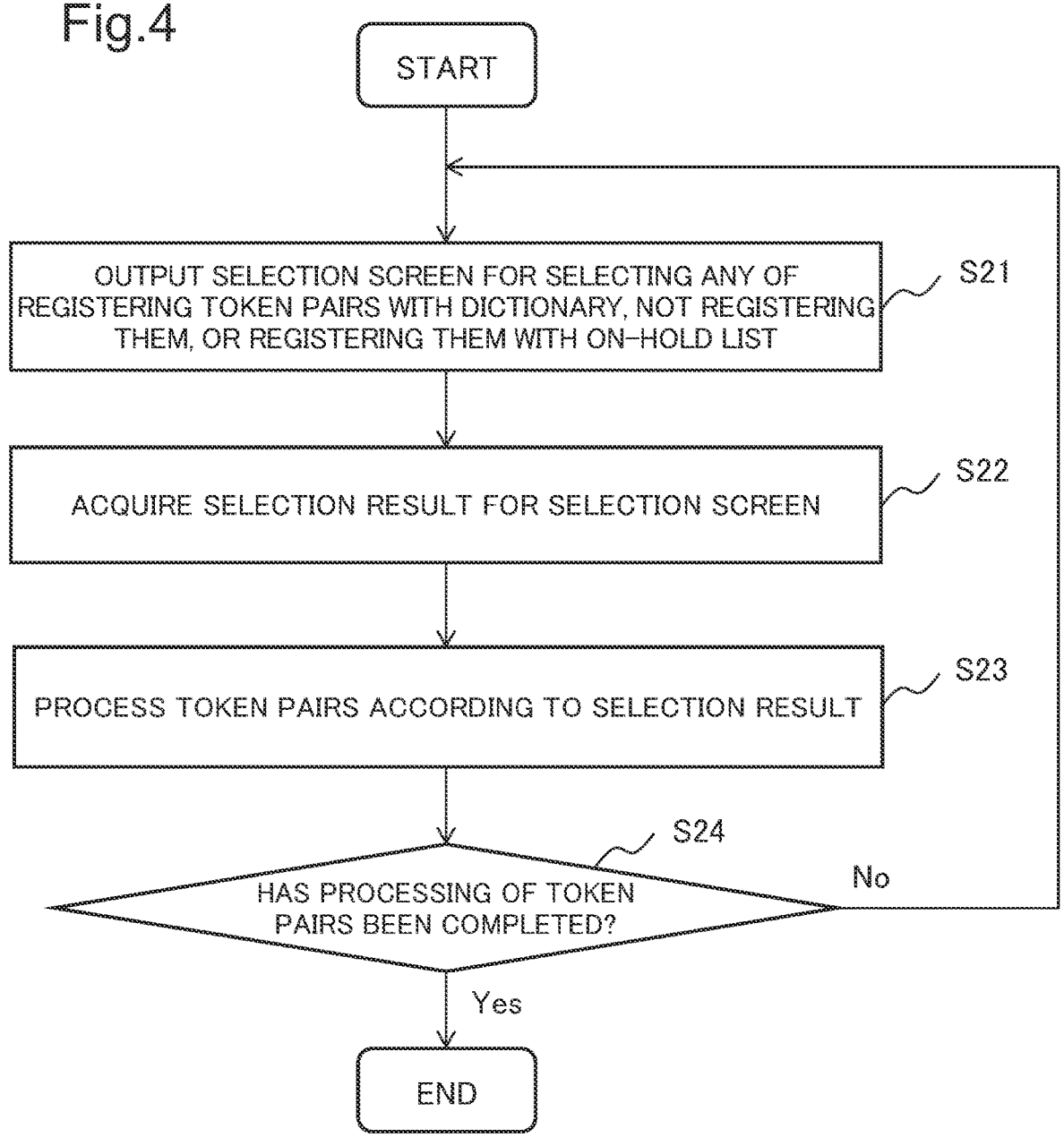
FIG. 4 is a view illustrating an example of the operation flow of the analysis system of the first example embodiment.
Figure 5:
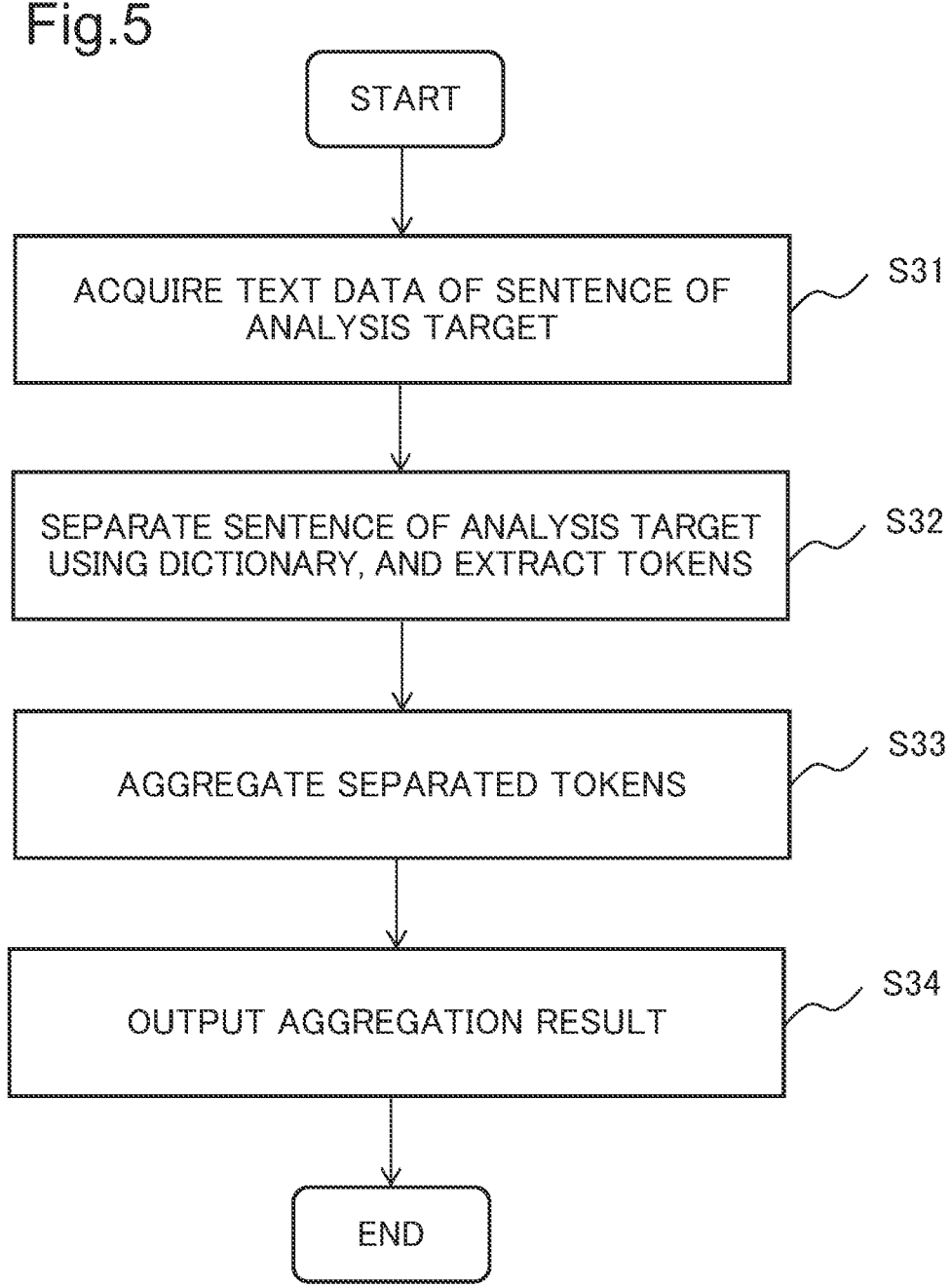
FIG. 5 is a view illustrating an example of the operation flow of the analysis system of the first example embodiment.

The operation of the information system of the present example embodiment will be described. FIGS. 3 to 5 are views illustrating an example of the operation flow of the analysis system 10. FIG. 3 is a view illustrating an example of the operation flow when a dictionary is generated. FIG. 4 is a view illustrating an example of the operation flow when processing of a token pair is performed in the operation of generating the dictionary. FIG. 5 is a view illustrating an example of the operation flow when a sentence is analyzed using the generated dictionary.

In FIG. 3, the data acquisition unit 11 acquires text data of the sentence used for generation of the dictionary (step S11). When the text data of the sentence used for generation of the dictionary is acquired, the extraction unit 12 separates the sentence using the simple rule and the basic dictionary and extracts a token pair from the sentence (step S12). Upon extracting the token pair, the extraction unit 12 aggregates the number of occurrences of each token pair, and generates, as a processing list, a list in which the token pair and the data of the number of occurrences are associated with each other. The dictionary generation unit 13 saves the data of the processing list in the storage unit 17.

When the token pair is extracted from the sentence, the dictionary generation unit 13 performs processing of registration of the token pair (step S13).

The processing of registration of the token pair will be described with reference to FIG. 4. The dictionary generation unit 13 selects the token pair having the highest number of occurrences from token pairs included in the processing list and having not been subjected to the confirmation processing. The dictionary generation unit 13 outputs, to the terminal device 20 via the output unit 16, the selection screen for selecting any of registering the selected token pair with the dictionary, not registering with the dictionary, and registering with an on-hold list (step S21).

Upon receiving the display data of the selection screen, the terminal device 20 displays the selection screen on the display device (not illustrated). The operator who views the selection screen operates the terminal device 20 to input, to the terminal device 20, the selection result of any of registering the token pair with the dictionary, not registering with the dictionary, and registering with an on-hold list.

Figure 6:
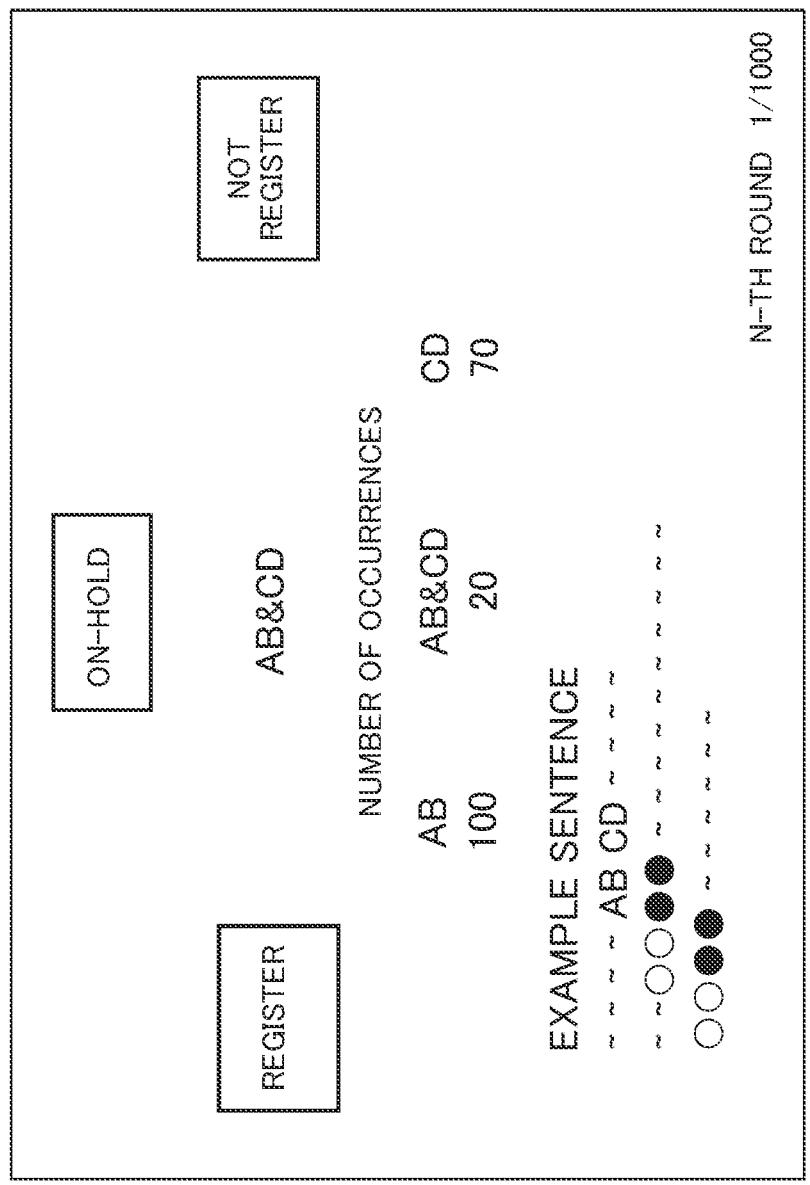
FIG. 6 is a view illustrating an example of a display screen of the first example embodiment.

FIG. 6 is a view illustrating an example of the selection screen for selecting any of registering a token pair with the dictionary, not registering, and registering with the on-hold list. In the example of FIG. 6, three types of buttons of "register", "on-hold", and "not register" are set. A token pair in which a token "AB" and a token "CD" are combined is displayed as "AB & CD". The number of occurrences indicates the number of occurrences of each of the token "AB" and the token "CD" and the number of occurrences of "AB & CD", that is, the number of consecutive occurrences of the token "AB" and the token "CD". The example sentence indicates a part including a place where a token pair occurs in the sentence from which token extraction has been performed. The N-th round indicates the number of repetitions of selecting all the token pairs extracted from the sentence. "$1/1000$" indicates as to what number, among the total number of token pairs, of the token pair for which the confirmation processing of necessity of registration is performed. "$1/1000$" indicates that there are 1000 token pairs, and the confirmation processing of necessity of registration is performed for the first token pair.

When "register" is selected on the selection screen of FIG. 6, the dictionary generation unit 13 performs processing of connecting and registering, with the dictionary, the token pair. When "on-hold" is selected, the dictionary generation unit 13 performs processing of connecting and registering, with the on-hold list, the token pair. When "not register" is selected, the dictionary generation unit 13 does not perform registration processing for the displayed token pair, and performs the confirmation processing for another token pair included in the processing list. For the token pair for which "not register" is selected, the dictionary generation unit 13 does not display a candidate of the token pair in the next and subsequent rounds.

The terminal device 20 receives the input of the selection result by clicking a button on the display screen by a mouse operation, for example. The necessity of registration of the token pair may be input by a flick operation or a tap operation on the screen in a touchscreen type display device. In the case of input by a flick operation, for example, in FIG. 6, the terminal device 20 receives the selection result as registration when the flick operation is performed from the right to the left of the screen, as non-registration when the flick operation is performed from the left to the right, and as on-hold when the flick operation is performed from the bottom to the top. The terminal device 20 may assign a number to each of registration, non-registration, and on-hold, and receive input of the selection result by receiving the number of taps on the screen, voice input, or input from the keyboard. For example, the terminal device 20 may have a function of returning to the selection screen of necessity of registration of a token pair for which the processing of necessity of registration has been performed immediately before in a case where the screen is tapped or clicked a plurality of times. By providing such input function, the operator who performs the registration operation of token pairs with the dictionary can easily perform the registration work.

When the selection result is input by the operator's operation, the terminal device 20 outputs the selection result to the analysis system 10 as input data.

In FIG. 4, the acquisition unit 15 of the analysis system 10 acquires, from the terminal device 20, the selection result of any of registering with the token pair, not registering, and registering with the on-hold list, that is, input data of the selection result on the selection screen (step S22).

When the selection result is acquired, the dictionary generation unit 13 performs processing according to the selection result for the token pair that is the target of acquisition of the selection result (step S23).

In a case where the selection result is registering the token pair with the dictionary, the dictionary generation unit 13 connects and registers, with the dictionary, the two tokens constituting the token pair. The dictionary generation unit 13 registers the information indicating as to what number of rounds or the cost with the dictionary in association with the token to be registered. In a case where the selection result is registering with the on-hold list, the dictionary generation unit 13 registers, with the on-hold list, the token in which two tokens constituting the token pair are connected. In a case where the selection result is not registering with the dictionary, the dictionary generation unit 13 does not register the token pair with either the dictionary or the on-hold list, and completes the processing for the token pair that is the target of processing. The dictionary generation unit 13 excludes, from the candidate of the token pair in the next round, the token pair that is not registered with the dictionary but is selected.

When the processing according to the selection result ends, the dictionary generation unit 13 confirms whether there is a token pair for which confirmation of necessity of registration with the dictionary is unprocessed among the token pairs included in the processing list. When there is a token pair for which confirmation of necessity of registration with the dictionary is unprocessed (No in step S24), the dictionary generation unit 13 returns to step S21 and performs processing related to registration of a token pair having the highest number of occurrences next to the token pair for which the processing has been completed.

When there is token pair for which confirmation of necessity of registration with the dictionary is unprocessed (Yes in step S24), the dictionary generation unit 13 determines that processing for one round has been completed for the processing of the token pair. The dictionary generation unit 13 may determine that the processing of the token pair is completed when completion is input in the middle of the processing for one round.

When it is determined that the processing for one round has been completed, the dictionary generation unit 13 outputs, to the terminal device 20 via the output unit 16, display data of the selection screen for selecting any of completing the generation of the dictionary and continuing the generation of the dictionary.

Upon receiving the display data, the terminal device 20 displays, on the display device, the selection result for selecting any of completing the generation of the dictionary and continuing the generation of the dictionary. When the selection result of any of completing the generation of the dictionary and continuing the generation of the dictionary is input by the operator's operation, the terminal device 20 outputs input data of the selection result to the analysis system 10.

The acquisition unit 15 of the analysis system 10 acquires, from the terminal device 20, the selection result of any of completing the generation of the dictionary and continuing the generation of the dictionary. In FIG. 3, in a case where the selection result is completing the generation of the dictionary (Yes in step S14), the dictionary generation unit 13 saves, as generated dictionary data, dictionary data with which each token pair is registered as a token in the storage unit 17 (step S18).

In a case where the selection result is continuing the generation of the dictionary (No in step S14), the dictionary generation unit 13 requests the extraction unit 12 to extract the token pair from the sentence using the dictionary with which the token pair is registered and the on-hold list.

Figure 7:
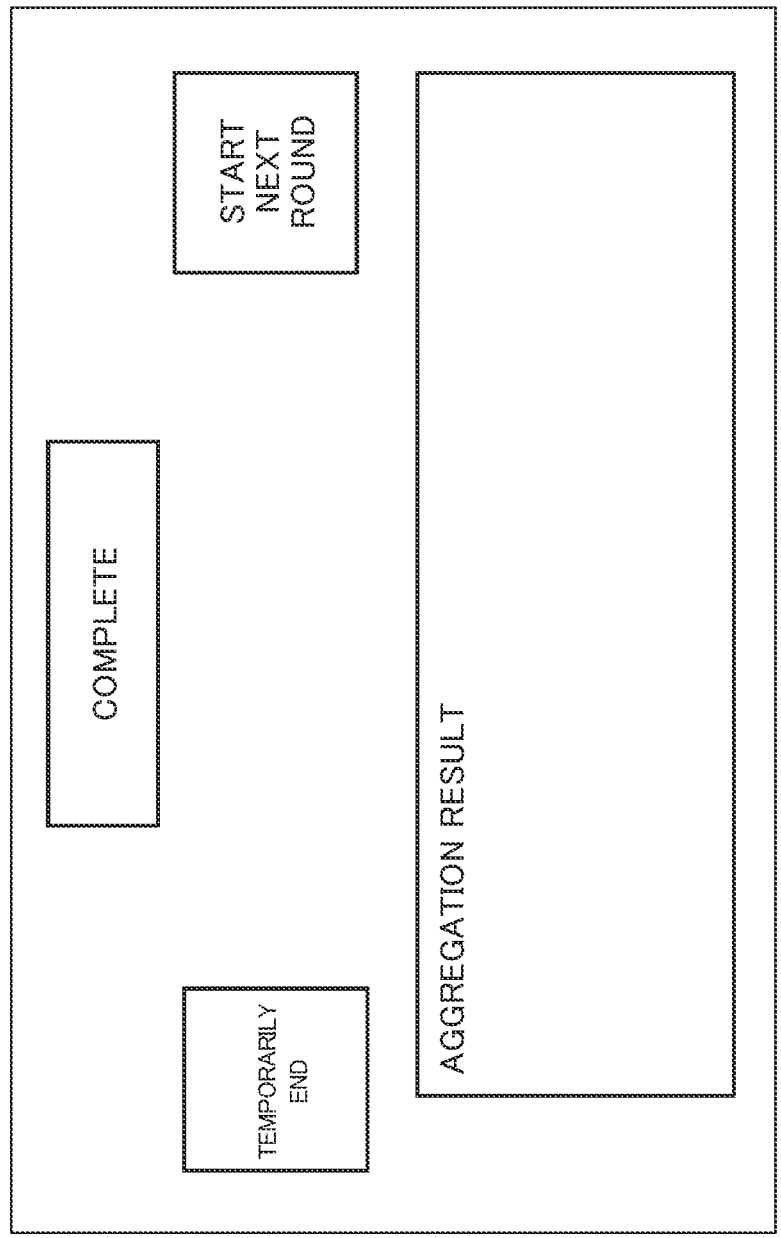
FIG. 7 is a view illustrating an example of the display screen of the first example embodiment.

FIG. 7 illustrates an example of the selection screen for selecting any of completing the generation of the dictionary and continuing the generation of the dictionary. In the example of FIG. 7, three types of buttons of "complete", "temporarily end", and "start next round" are set. In FIG. 7, the aggregation result is displayed. The field of the aggregation result displays the number of occurrences of each token extracted using the dictionary generated from the sentence used for generation of the dictionary, for example. The field of the aggregation result may display an image generated by the word cloud. The number of occurrences of each token extracted using the dictionary is aggregated by the analysis unit 14. When the screen of FIG. 7 is displayed, the terminal device 20 receives, similarly to the case of FIG.

6, input of the selection result by a click operation on the screen, a flick operation, a tap operation, a keyboard input, or a voice input.

In FIG. 3, when the processing of the token pair in the next round is started, the dictionary generation unit 13 performs separation of the sentence using the simple rule, the basic dictionary, the dictionary generated before one round, and the on-hold list, and extracts a token pair (step S15). After extracting the token pair, the dictionary generation unit 13 carries out, similarly to the first round, the processing of registration of the token pair from step S21 to step S24 in FIG. 4 (step S16).

When the processing of the token pair for one round is completed, the dictionary generation unit 13 outputs, to the terminal device 20 via the output unit 16, the selection screen for selecting any of completing the generation of the dictionary and continuing the generation of the dictionary.

The terminal device 20 displays, on the display device, a display screen for inputting the selection result of any of completing the generation of the dictionary and continuing the generation of the dictionary. When the selection result of any of completing the generation of the dictionary and continuing the generation of the dictionary is input by the operator's operation, the terminal device 20 outputs input data of the selection result to the analysis system 10.

In a case where the selection result is completing the generation of the dictionary (Yes in step S17), the dictionary generation unit 13 saves, with the storage unit 17 as the generated dictionary data, the dictionary data with which the token pair is registered (step S18).

In a case where the selection result is continuing the generation of the dictionary (No in step S17), the dictionary generation unit 13 repeats the operation from step S15.

Figure 8:
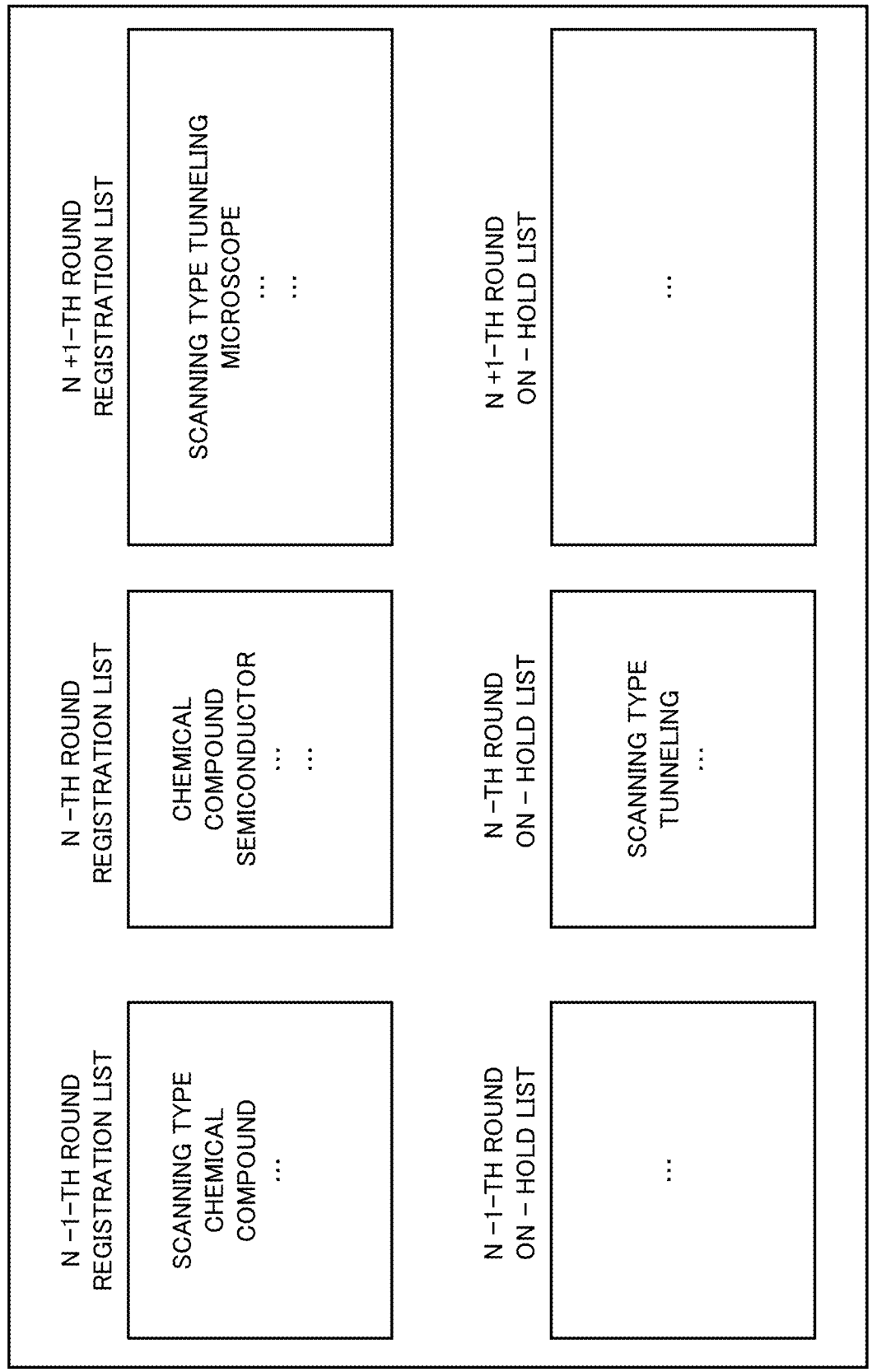
FIG. 8 is a view illustrating an example of a token pair of the first example embodiment.

FIG. 8 illustrates an example of tokens included with the dictionary generated in each round. FIG. 8 illustrates an example in a case where a "compound semiconductor" and a "scanning tunneling microscope" are registered with the dictionary. It is assumed that "compound semiconductor" is separated into "compound", and "semiconductor" according to the basic dictionary. It is assumed that "scanning tunneling microscope" is separated into "scanning", "type", "tunneling", and "microscope" according to the basic dictionary. In FIG. 8, the tokens "compound" and "scanning type" registered in the N−1-th round are further connected in the N-th round, and "compound semiconductor" is newly registered. In the N-th round, "scanning type tunneling" is registered with the on-hold list. In the N+1-th round of FIG. 8, the tokens are connected further than in the N-th round, and "scanning type tunneling microscope" is newly registered. In the N+1-th round, "scanning type tunneling", which is registered with the on-hold list in the N-th round, and "microscope", which is included in the basic dictionary, are extracted as a token pair, and, by selecting registering with the dictionary, "scanning type tunneling microscope" is newly registered with the dictionary. Every time round is repeated in this manner, the dictionary generation unit 13 newly registers, with the dictionary, a long token, that is, a token having a large number of connected tokens.

Next, the operation when analyzing the sentence using generated dictionary data will be described.

In FIG. 5, the data acquisition unit 11 acquires text data of the sentence of the analysis target (step S31). In a case where the sentence used for generation of the dictionary and the sentence of the analysis target are the same, the data acquisition unit 11 may read text data of the sentence from the storage unit 17. The acquisition unit 15 acquires information on the dictionary used for analysis. The acquisition unit 15 acquires, as information on the dictionary used for analysis, the selection result of the dictionary used for analysis input to the terminal device 20 by the operator's operation, for example.

When the text data of the sentence of the analysis target and the information of the dictionary used for analysis are acquired, the analysis unit 14 separates the sentence of the analysis target by morphological analysis using the dictionary used for analysis, and extracts the token from the sentence of the analysis target (step S32). When the token is extracted from the data of the sentence of the analysis target, the analysis unit 14 aggregates the number of occurrences of each extracted token (step S33).

When the number of occurrences of each extracted token is aggregated, the analysis unit 14 generates a list in which terms are arranged in descending order of the number of occurrences of the token. When the list in descending order of the number of occurrences is generated, the analysis unit 14 generates display data according to the number of occurrences. The analysis unit 14 generates, as display data, an image in which as a token having a higher number of occurrences is in larger characters and arranged at the center, for example. When the display data according to the number of occurrences is generated, the output unit 16 outputs the generated display data to the terminal device 20.

Upon receiving the display data generated according to the number of occurrences, the terminal device 20 displays, on the display device, the display data generated according to the number of occurrences.

The storage unit 17 may save an analysis result including an image generated by the analysis unit 14.

The acquisition unit 15 may receive, from the terminal device 20, as a stopword, a token unnecessary for analysis including an article such as 'a' and 'the' or the like among tokens included in the analysis result. The stopword is a token unnecessary as an analysis target for the purpose of analysis. The stopword is acquired as a token list indicating unnecessary tokens as the analysis target, for example. The token list is input to the terminal device 20 with reference to the analysis result by the operator's operation, for example. The stopword may be set in advance. Upon receiving the token list indicating unnecessary tokens as the analysis target via the acquisition unit 15, the analysis unit 14 removes the tokens included in the token list indicating unnecessary tokens as the analysis target from the tokens extracted from the sentence, and generates the analysis result. The storage unit 17 may save a token list indicating stopwords.

The output unit 16 may output a list of the tokens extracted from the sentence and the number of occurrences of each token to the terminal device 20. In a case of such configuration, the terminal device 20 may generate data of image according to the number of occurrences.

FIG. 9 is a view illustrating an example of the display screen when generation of the dictionary is started. In FIG. 9, the name of the dictionary being generated is displayed as a project name. A latest lap count indicates how many rounds have been ended. A processing status indicates how many token pairs of the total number of token pairs have been processed in the current round. The word cloud displays data based on the number of occurrences of the token when the analysis unit 14 aggregates the number of occurrences of the token using the dictionary generated up to the present time point.

A "history" button in FIG. 9 is a button for calling data of the dictionary generated up to the previous round. When input by the "history" button is received from the terminal device 20 via the acquisition unit 15, the dictionary generation unit 13 outputs dictionary data via the output unit 16 to the terminal device 20. A "continued" button is a button for resuming generation of the dictionary from the middle of round. A "new" button is a button used when a new dictionary is generated. When input by the "continued" button or the "new" button is received from the terminal device 20 via the acquisition unit 15, the dictionary generation unit 13 starts generation of the dictionary.

In FIG. 9, any of all the rounds performed so far may be selected when history display is performed. A result of word cloud generated using the dictionary for each round may be possible to be confirmed. It may be possible to return to the round selected when the history is displayed, and redo dictionary generation from the selected round. Only a part of the tokens registered with the dictionary in each round may be possible to be corrected.

In FIG. 9, a dictionary "BBBB" being generated is in the first round, and therefore the "history" button is in a state of being unselectable. Also in the first round, the history of the registration processing of the token pair within the first round may be able to be confirmed. in FIG. 9, for a dictionary "CCCC" for which generation has been completed, the "continued" button is in a state of being unselectable. In place of such configuration, the configuration in which the generation of the dictionary for which completion of generation has once been selected can be resumed again may be employed.

Figure 10:
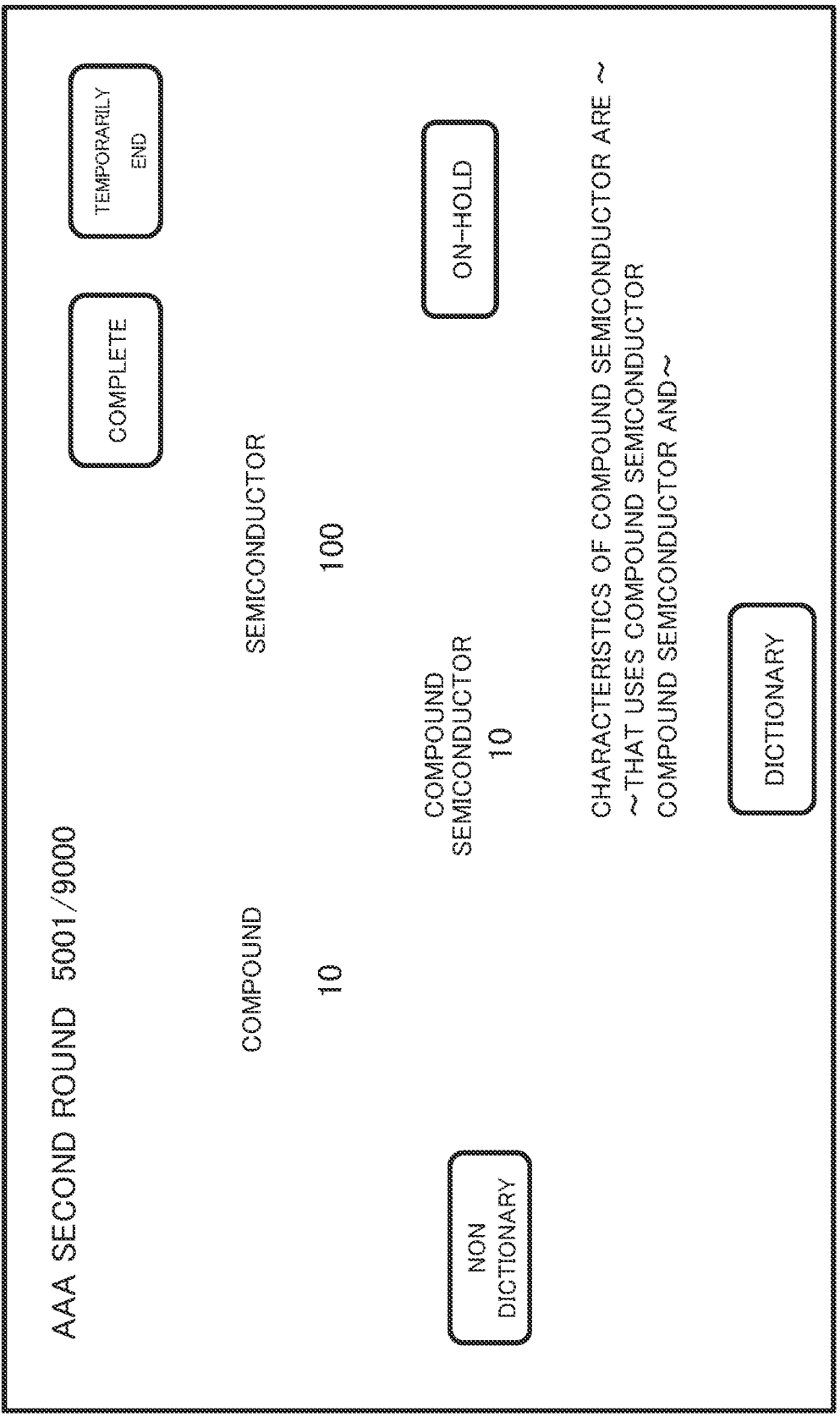
FIG. 10 is a view illustrating an example of the display screen of the first example embodiment.

FIG. 10 illustrates an example of the screen for selecting the presence or absence of registration of a token pair with the dictionary. In the example of FIG. 10, similarly to FIG. 6, three types of buttons of "register", "on-hold", and "not register" are set. In the example of FIG. 10, "compound semiconductor", which is a token pair, and the token "compound" and the token "semiconductor" that form the token pair are displayed. Numerical values under the token pair and the tokens indicate the number of occurrences. "Temporarily end" in the upper part of FIG. 10 is selected when the work is temporarily interrupted. "Complete" in the upper part of FIG. 10 is selected when the generation of the dictionary is completed. In a case where "complete" is selected, even if an unprocessed token pair is left behind, the processing of that round ends.

Figure 11:
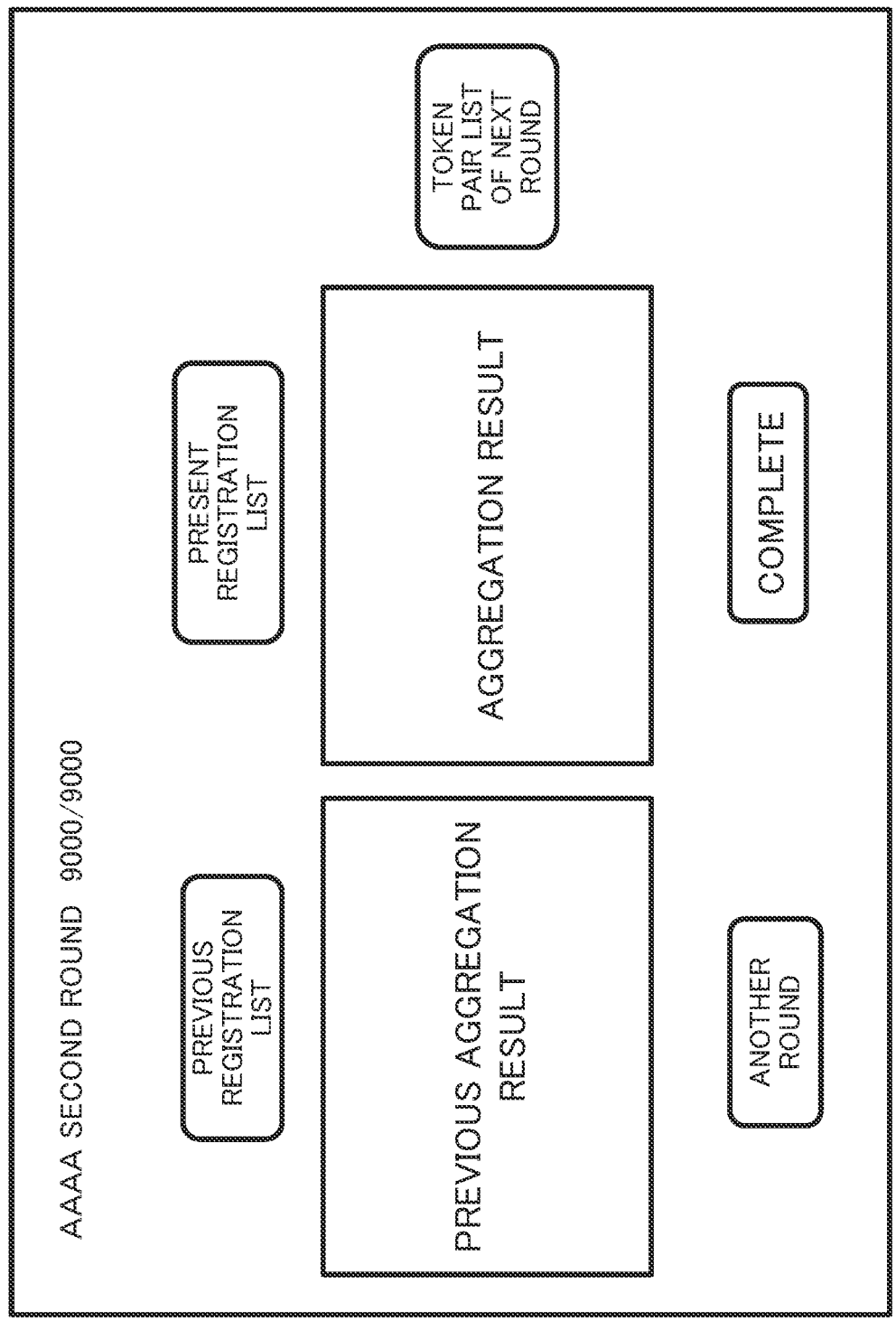
FIG. 11 is a view illustrating an example of the display screen of the first example embodiment.

FIG. 11 illustrates an example of the screen for further selecting whether to continue or whether to complete the generation of the dictionary when the processing of the token pair is completed for one round. When "another round" in the lower part of FIG. 11 is selected, generation of the dictionary in the next round is started. When "complete" is selected, the dictionary generation unit 13 completes the generation of the dictionary and saves the generated dictionary into the storage unit 17. "Token pair list of next round" is a button for displaying a list of token pairs in the next round. When the input data in which "token pair list of next round" is selected in the terminal device 20 is received via the acquisition unit 15, the dictionary generation unit 13 outputs, via the output unit 16, information on the token pair extracted by the extraction unit 12. "Present registration list" is a button for displaying a list of tokens registered with the dictionary in the present round. "Previous registration list" is a button for displaying a list of token pairs registered in the previous round. When the input data in which "present registration list" or "previous registration list" is selected in the terminal device 20 is received via the acquisition unit 15, the dictionary generation unit 13 outputs, via the output unit 16, information on the token registered with the dictionary in the corresponding round. The fields of a previous aggregation result and a current aggregation result display aggregation results in a case where tokens are extracted from the sentence using the dictionary up to the previous time and the dictionary up to the present time on the basis of the aggregation result by the analysis unit 14. The aggregation result may be displayed using the word cloud.

The dictionary generated using the analysis system 10 of the present example embodiment can be used for analysis of terms used in academic papers, for example. For example, by generating a dictionary by the dictionary generation unit 13 using papers in the field of information science, and separating the papers for each date released using the generated dictionary, the analysis system 10 can output the tendency of the tokens used in each date by the output unit 16. By aggregating the tendency of the tokens used in each date, it is possible to analyze the tendency of the technology in each age. For the target of analysis of the tendency, for example, any of the body, the summary, or the title of a paper is used.

Figure 12:
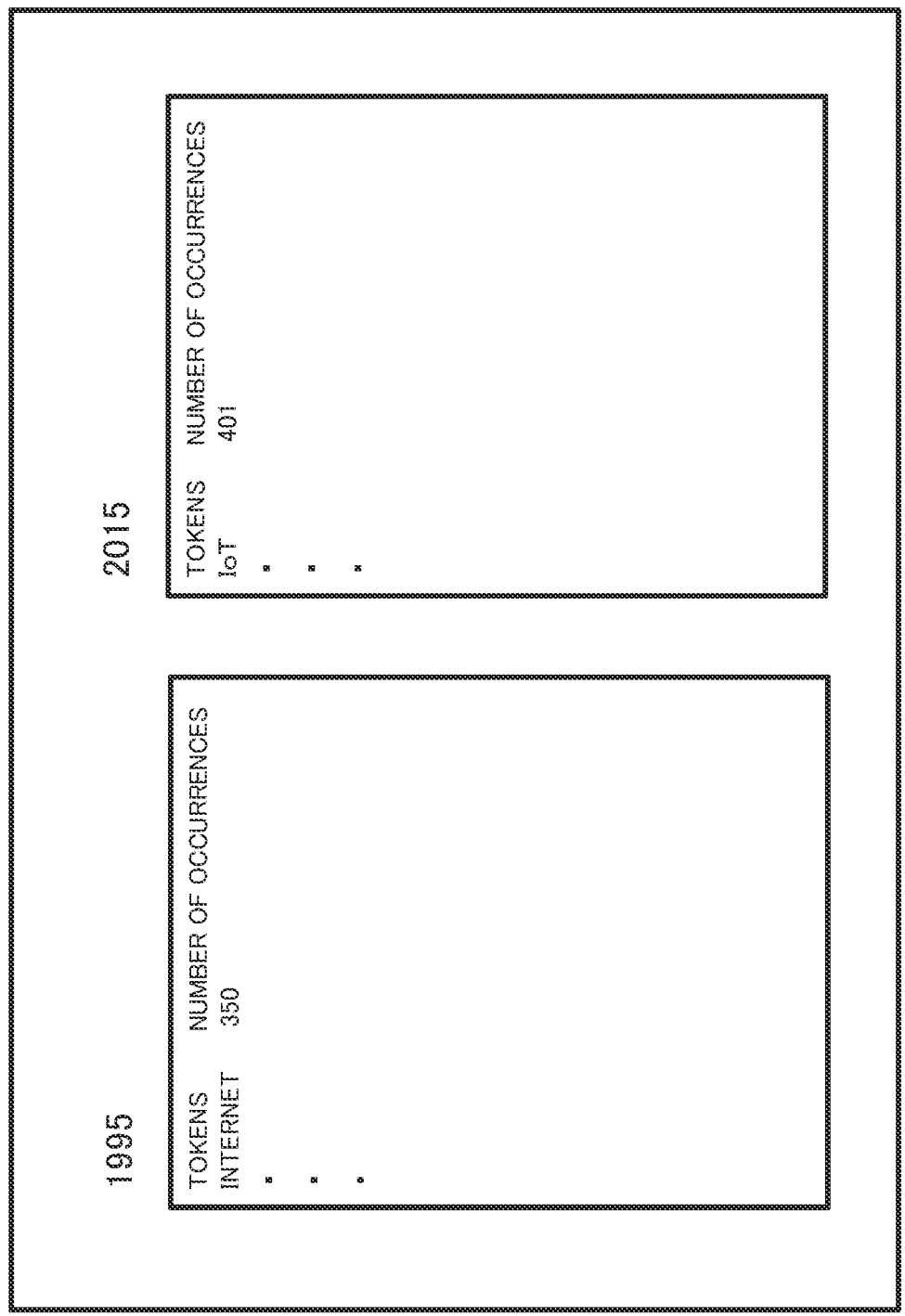
FIG. 12 is a view illustrating an example of the display screen of the first example embodiment.

FIG. 12 illustrates an example of the display screen of an analysis result in a case where papers for each date are analyzed using the generated dictionary. The example of FIG. 12 illustrates a display screen regarding analysis results of papers in the field of information science with 1995 and 2015 as target dates. The example of FIG. 12 indicates that the frequency of use of the token "Internet" is high in 1995, and the frequency of use of the token "Internet of Things (IoT)" is high in 2015. The frequency of use of the token may be displayed using the form of word cloud. The example of FIG. 12 presents the tendency for each date, but for example, classification may be performed using another index such as each attribute of authors of papers.

In the above example, an analysis example in the field of information science has been presented, but the target field of analysis may be other than the field of information science. The target field of analysis is not limited to the academic field, and may be, for example, documents issued by governments, company press releases, data on the Internet, movie titles, song titles, song lyrics, book titles, magazine articles, newspaper articles, newspaper headlines, catchphrases, or product names. The analysis target is not limited to the above examples as long as it includes a token.

The analysis system 10 of the information system of the present example embodiment separates sentences to be used for generation of a dictionary, using the simple rule and the basic dictionary, and extracts two consecutive tokens as a token pair. The analysis system 10 displays the selection screen for selecting whether to register the token pair with the dictionary, whether to register with the on-hold list, or whether not to register with the dictionary, and performs registration processing with the dictionary according to the selection result. Therefore, use of the analysis system 10 of the present example embodiment allows the operator to easily perform the work of registration with the dictionary while viewing the selection screen.

The analysis system 10 retains information on a token pair whose registration with the dictionary is on-hold using the on-hold list, further extracts a token pair from the sentence using the on-hold list and the generated dictionary, and displays the selection screen for confirming necessity of registration with the dictionary or registration with the on-hold list. Therefore, use of the analysis system 10 of the present example embodiment allows the operator to easily perform the work of registration with the dictionary while viewing the selection screen, also regarding the token in which a token pair is further combined with a token, that is, the token in which equal to or more than three tokens are connected. Therefore, use of the analysis system 10 of the present example embodiment makes it possible to suppress the work amount required for generation of a dictionary suitable for the sentence of the analysis target. Since it is possible to easily obtain a dictionary suitable for analysis of a document of the analysis target by suppressing the work amount required for generation of the dictionary, the analysis system 10 of the present example embodiment can improve the accuracy of analysis of the sentence based on the number of occurrences of tokens included in the sentence.

Second Example Embodiment

Figure 13:
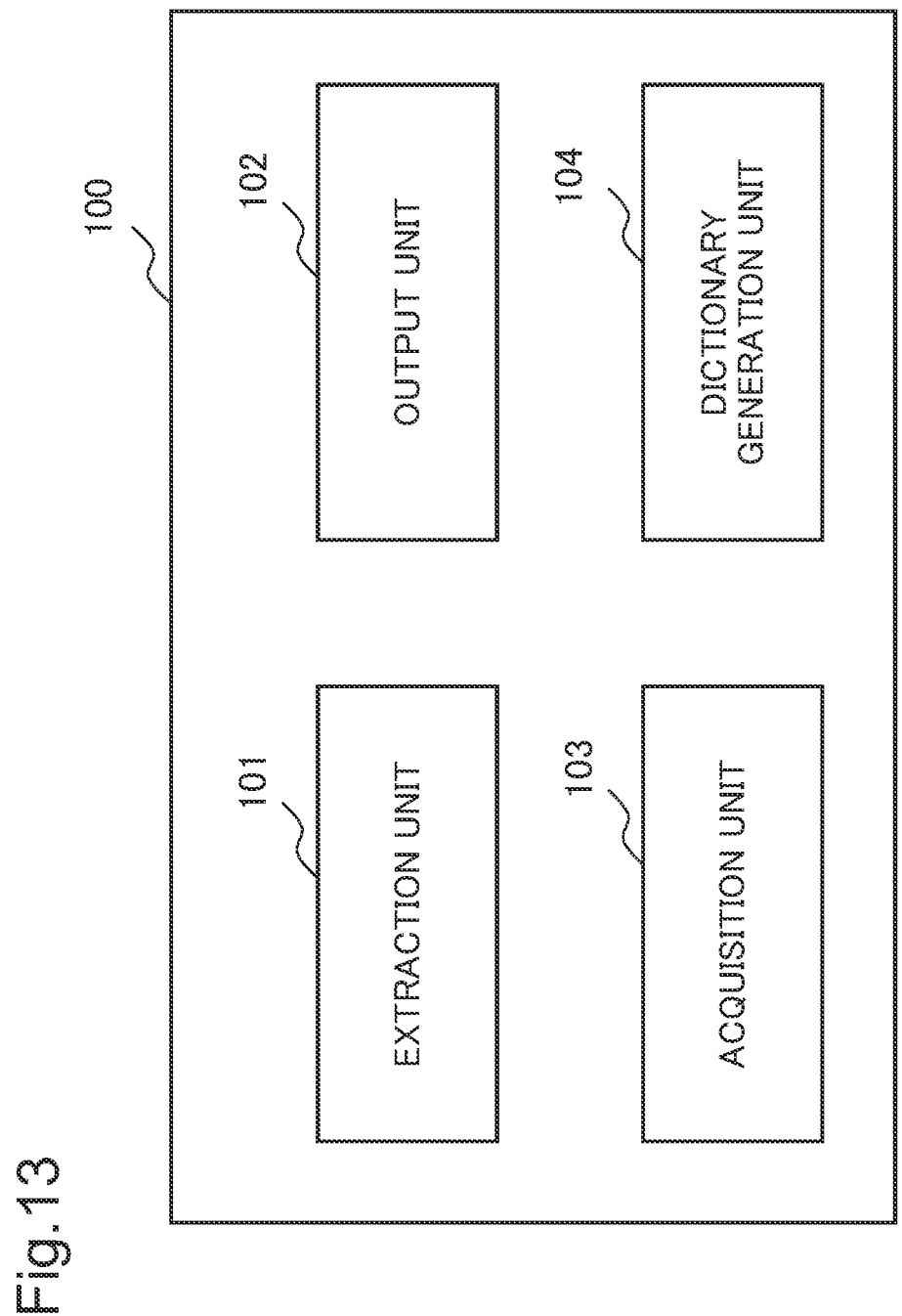
FIG. 13 is a view illustrating an example of a configuration of an analysis system of a second example embodiment.

The second example embodiment of the present disclosure will be described in detail with reference to the drawings. FIG. 13 is a view illustrating an example of the configuration of an analysis system 100 of the present example embodiment. The analysis system 100 includes an extraction unit 101, an output unit 102, an acquisition unit 103, and a dictionary generation unit 104. The extraction unit 101 extracts, as a token pair, two tokens that consecutively occur in a sentence separated using the simple rule and the basic dictionary. Regarding a token in which two tokens included in a token pair are connected, the output unit 102 outputs a selection screen for selecting any of registering with a dictionary, registering with an on-hold list for holding registration with the dictionary, and not registering with the dictionary. The acquisition unit 103 acquires a selection result for the selection screen. The dictionary generation unit 104 generates an on-hold list with which the token pair whose selection result indicates on-hold is registered as a token, and the dictionary with which the token pair whose selection result indicates registering is registered as a token.

The extraction unit 12 of the first example embodiment is an example of the extraction unit 101. The extraction unit 101 is an aspect of the extraction means. The output unit 16 is an example of the output unit 102. The output unit 102 is an aspect of the output means. The acquisition unit 15 is an example of the acquisition unit 103. The acquisition unit 103 is an aspect of the acquisition means. The dictionary generation unit 13 is an example of the dictionary generation unit 104. The dictionary generation unit 104 is an aspect of the dictionary generation means.

Figure 14:
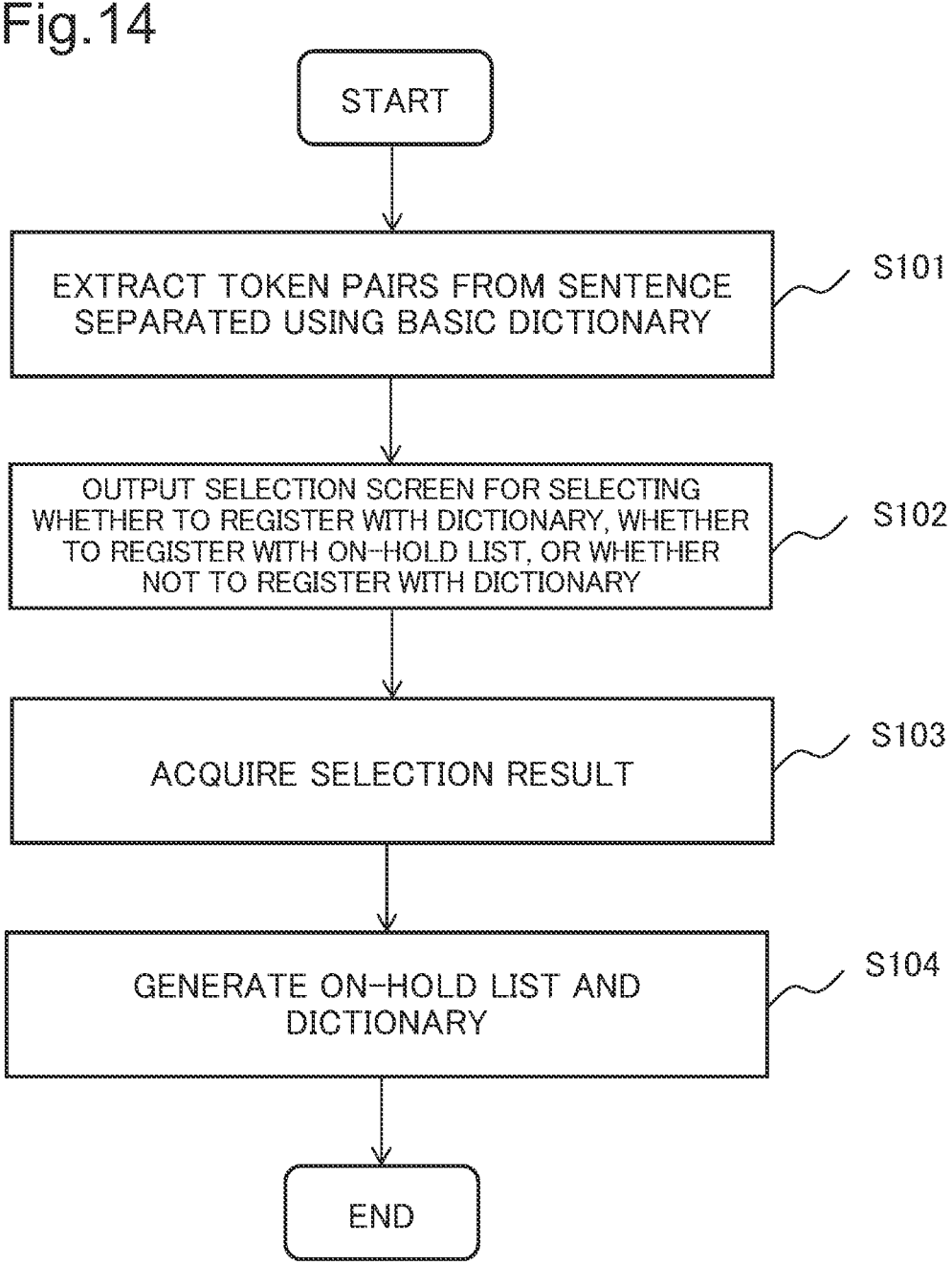
FIG. 14 is a view illustrating an example of an operation flow of the analysis system of the second example embodiment.

The operation of the analysis system 100 of the present example embodiment will be described. FIG. 14 is a view illustrating an example of the operation flow of the analysis system 100. The extraction unit 101 extracts, as a token pair, two tokens that consecutively occur in a sentence separated using the simple rule and the basic dictionary (step S101). When the token pair is extracted, the output unit 102 outputs the selection screen for selecting any of registering with the on-hold list for holding registration with the dictionary and not registering with the dictionary (step S102), regarding the token in which two tokens included in the token pair are connected. When the selection screen is output, the acquisition unit 103 acquires the selection result for the selection screen (step S103). When the selection result is acquired, the dictionary generation unit 104 generates an on-hold list with which the token pair whose selection result indicates on-hold is registered as a token, and a second dictionary with which the token pair whose selection result indicates registering is registered as a token (step S104).

The analysis system 100 of the present example embodiment separates a sentence into tokens using the simple rule and the basic dictionary, and outputs, as a token pair, two consecutive tokens from the sentence. The analysis system 100 outputs the selection screen for selecting whether to register the token pair with the dictionary or whether to register with the on-hold list, and registers the token pair with the dictionary or the on-hold list according to the selection result. Thus, by generating the on-hold list in addition to the dictionary, it is possible to determine, regarding a token pair that has not been registered with the dictionary, in a case where of being further combined with another token using the on-hold list. As a result, use of the analysis system 100 of the present example embodiment makes it possible to generate a dictionary including a token in which equal to or more than three tokens are combined, and to improve the accuracy of sentence analysis.

Figure 15:
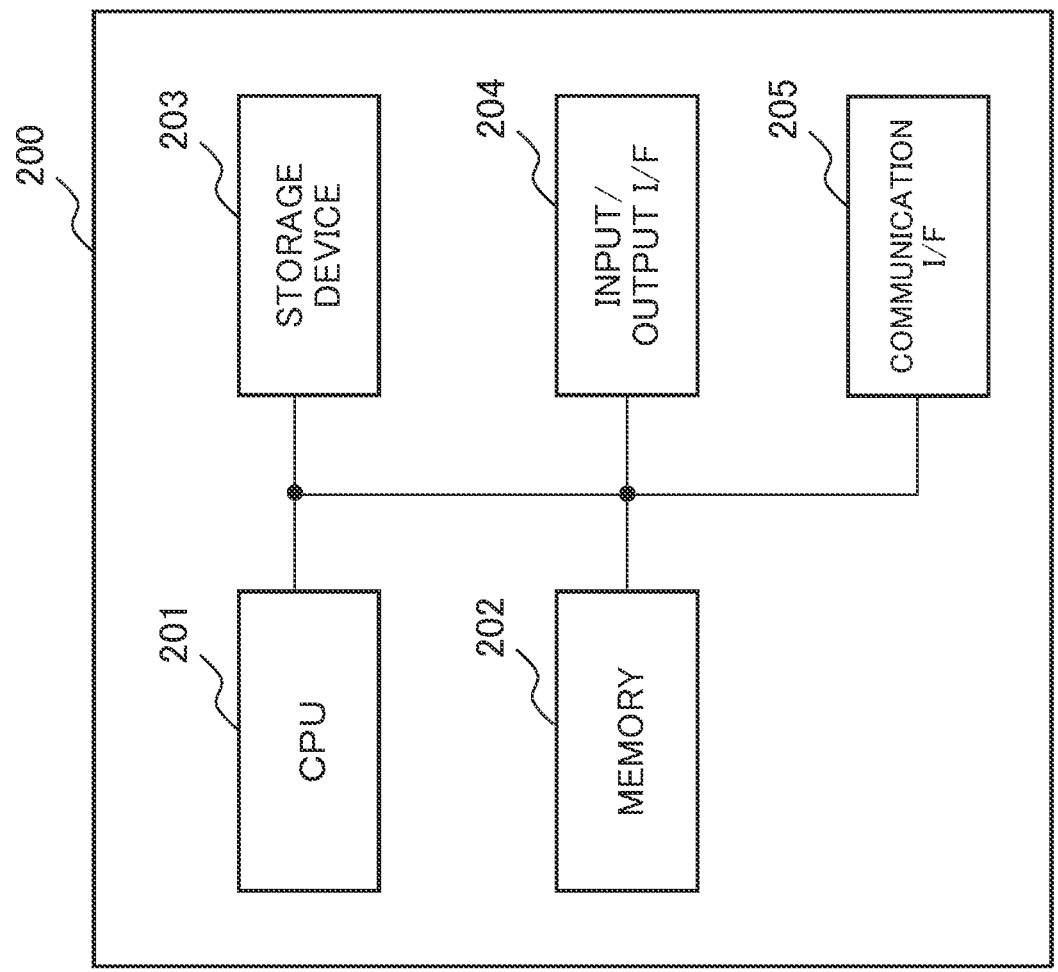
FIG. 15 is a view illustrating an example of another configuration of an example embodiment.

Each processing in the analysis system 10 of the first example embodiment and the analysis system 100 of the second example embodiment can be achieved by a computer executing a computer program. FIG. 15 illustrates an example of the configuration of a computer 200 that executes a computer program for performing each processing in the analysis system 10 of the first example embodiment and the analysis system 100 of the second example embodiment. The computer 200 includes a central processing unit (CPU) 201, a memory 202, a storage device 203, an input/output interface (I/F) 204, and a communication I/F 205.

The CPU 201 reads and executes the computer program for performing each processing from the storage device 203. The CPU 201 may be configured by combination of a plurality of CPUs. The memory 202 includes a dynamic random access memory (DRAM), and temporarily stores the computer program executed by the CPU 201 and data being processed. The storage device 203 stores the computer program executed by the CPU 201. The storage device 203 includes, for example, a nonvolatile semiconductor storage device. As the storage device 203, another storage device such as a hard disk drive may be used. The input/output I/F 204 is an interface that receives input from the operator and outputs display data and the like. The communication I/F 205 is an interface that transmits and receives data to and from the terminal device 20 and another information processing device. The terminal device 20 can have a similar configuration.

The computer program used for executing each processing can also be stored in a non-transitory recording medium and distributed. As the recording medium, for example, a magnetic tape for data recording or a magnetic disk such as a hard disk can be used. As the recording medium, an optical disk such as a compact disc read only memory (CD-ROM) can also be used. A nonvolatile semiconductor storage device may be used as the recording medium.

A part or the entirety of the above example embodiments can be described as the following supplementary notes, but are not limited to the following.

[Supplementary Note 1]

An analysis system including:
  an extraction means configured to extract, as a token pair, two tokens that consecutively occur in a sentence separated by using a simple rule and a basic dictionary;
  an output means configured to output a selection screen for selecting, regarding a token in which two tokens included in the token pair are connected, any of registering with a dictionary, registering with an on-hold list for holding registration with the dictionary, and not registering with the dictionary;
  an acquisition means configured to acquire a selection result for the selection screen; and a dictionary generation means configured to generate an on-hold list with which the token pair whose selection result indicates on-hold is registered as a token, and the dictionary with which the token pair whose selection result indicates registering is registered as a token.

[Supplementary Note 2]

The analysis system according to Supplementary Note 1, in which
the extraction means extracts, as the token pair, two tokens that consecutively occur in the sentence based on the tokens registered with the basic dictionary, the dictionary, and the on-hold list,
the acquisition means acquires the selection result for the token pair extracted using the basic dictionary, the dictionary, and the on-hold list, and
the dictionary generation means updates the dictionary and the on-hold list based on the selection result.

[Supplementary Note 3]

The analysis system according to Supplementary Note 1 or 2, in which
the extraction means narrows down the token pair that is a target of processing based on a predetermined criterion.

[Supplementary Note 4]

The analysis system according to any of Supplementary Notes 1 to 3, in which
the output means outputs a selection screen that displays the token pairs in a predetermined order, and outputs the selection screen that displays, in the predetermined order, the token pairs further extracted from the sentence by the extraction means based on the token registered with the basic dictionary, the dictionary, and the on-hold list when output of the selection screen for all the token pairs extracted from the sentence is completed.

[Supplementary Note 5]

The analysis system according to any of Supplementary Notes 1 to 4, in which
the output means outputs the selection screen that displays information on a number of occurrences in the sentence for each token included in the token pair.

[Supplementary Note 6]

The analysis system according to any of Supplementary Notes 1 to 5, in which
the output means outputs the selection screen that displays, as an example, a part including the token pair in the sentence.

[Supplementary Note 7]

The analysis system according to any of Supplementary Notes 1 to 6 further including:
an analysis means configured to extract a token from a sentence using the dictionary and analyze the sentence, in which
the output means outputs an image that displays at least one of a size and a position of a character of a token extracted from the sentence according to a number of occurrences of the token in the sentence based on a result of the analysis.

[Supplementary Note 8]

The analysis system according to Supplementary Note 7, in which
the analysis means extracts a token from the sentence by using a token having a larger number of connected tokens than other tokens in a case where, regarding a part including a same place of the sentence, there are a plurality of ways of separation using different tokens included with the dictionary.

[Supplementary Note 9]

The analysis system according to Supplementary Note 7 or 8, in which
using a token list indicating an unnecessary token as an analysis target, the analysis means generates an analysis result in which a token included in the token list is removed from tokens extracted from the sentence.

[Supplementary Note 10]

The analysis system according to any of Supplementary Notes 1 to 9, in which
when extracting the token pair using the token registered with the basic dictionary, the dictionary, and the on-hold list, the extraction means excludes and extracts the token pair whose selection result indicates that registration is unnecessary.

[Supplementary Note 11]

An analysis method including:
extracting, as a token pair, two tokens that consecutively occur in a sentence separated into tokens by using a simple rule and a basic dictionary;
outputting a selection screen for selecting, regarding a token in which two tokens included in the token pair are connected, any of registering with a dictionary, registering with an on-hold list for holding registration with the dictionary, and not registering with the dictionary;
acquiring a selection result for the selection screen; and
generating an on-hold list with which the token pair whose selection result indicates on-hold is registered as a token, and the dictionary with which the token pair whose selection result indicates registering is registered as a token.

[Supplementary Note 12]

An analysis program that causes a computer to execute
processing of extracting, as a token pair, two tokens that consecutively occur in a sentence separated into tokens by using a simple rule and a basic dictionary,
processing of outputting a selection screen for selecting, regarding a token in which two tokens included in the token pair are connected, any of registering with a dictionary, registering with an on-hold list for holding registration with the dictionary, and not registering with the dictionary,
processing of acquiring a selection result for the selection screen, and
processing of generating an on-hold list with which the token pair whose selection result indicates on-hold is registered as a token, and the dictionary with which the token pair whose selection result indicates registering is registered as a token The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:
1. An analysis system comprising:
at least one memory storing instructions; and at least one processor configured to access the at least one memory and execute the instructions to:

acquire, from a terminal device operated by an operator, text data for generating a dictionary;

extract, as a token pair, two tokens that consecutively occur in a sentence by using natural language processing based on a simple rule and a basic dictionary;

output, to the terminal device, a selection screen for selecting, regarding a token to which the two tokens included in the token pair are connected, any of:
registering with the dictionary,
registering with an on-hold list for holding registration with the dictionary, and
not registering with the dictionary,
wherein the selection screen includes a button for registering with the dictionary, a button for registering with the on-hold list for holding the registration with the dictionary, and a button for not registering with the dictionary;

acquire, from the terminal device, a selection result selected by the operator on the selection screen that is displayed on the terminal device;

when the button for registering with the dictionary is selected by the operator on the selection screen, register the token in the dictionary with the two tokens in the token pair;

when the button for registering with the on-hold list is selected by the operator on the selection screen, generate the on-hold list and register the token in the on-hold list with the two tokens in the token pair; and when the button for not registering with the dictionary is selected by the operator on the selection screen, do not register the token in the dictionary with the two tokens in the token pair.

2. The analysis system according to claim 1, wherein the at least one processor is further configured to execute the instructions to:

extract, as the token pair, two tokens that consecutively occur in the sentence based on the tokens registered with the basic dictionary, the dictionary, and the on-hold list;

acquire the selection result for the token pair extracted using the basic dictionary, the dictionary, and the on-hold list; and update the dictionary and the on-hold list based on the selection result.

3. The analysis system according to claim 1, wherein the at least one processor is further configured to execute the instructions to:

narrow down the token pair that is a target of processing based on a predetermined criterion.

4. The analysis system according to claim 1, wherein the at least one processor is further configured to execute the instructions to:

display the selection screen that displays token pairs in a predetermined order; and display the selection screen that displays, in the predetermined order, the token pairs further extracted from the sentence based on the token registered with the basic dictionary, the dictionary, and the on-hold list after the selection screen for all the token pairs extracted from the sentence is output.

5. The analysis system according to claim 1, wherein the at least one processor is further configured to execute the instructions to:

display the selection screen that displays information on a number of occurrences in the sentence for each token included in the token pair.

6. The analysis system according to claim 1, wherein the at least one processor is further configured to execute the instructions to:

display the selection screen that displays, as an example, a part including the token pair in the sentence.

7. The analysis system according to claim 1, wherein the at least one processor is further configured to execute the instructions to:

extract a token from a sentence using the dictionary and analyze the sentence; and output an image that displays at least one of a size and a position of a character of the token extracted from the sentence according to a number of occurrences of the token in the sentence based on a result of the analysis.

8. The analysis system according to claim 7, wherein the at least one processor is further configured to execute the instructions to:

extract a token from the sentence by using a token having a larger number of connected tokens than other tokens in a case where, regarding a part including a same place of the sentence, there are a plurality of ways of separation using different tokens included with the dictionary.

9. The analysis system according to claim 7, wherein the at least one processor is further configured to execute the instructions to:

remove a token included in a token list from tokens extracted from the sentence, wherein the token list includes an unnecessary token as an analysis target; and generate a result of the analysis.

10. The analysis system according to claim 1, wherein the at least one processor is further configured to execute the instructions to:

extract the token pair based on the token registered with the basic dictionary, the dictionary, and the on-hold list by excluding a token pair for which a selection result indicates that registration is unnecessary.

11. An analysis method performed by a computer and comprising:

acquiring, from a terminal device operated by an operator, text data for generating a dictionary;

extracting, as a token pair, two tokens that consecutively occur in a sentence by using natural language processing based on a simple rule and a basic dictionary;

outputting, to the terminal device, a selection screen for selecting, regarding a token to which the two tokens included in the token pair are connected, any of:
registering with the dictionary,
registering with an on-hold list for holding registration with the dictionary, and
not registering with the dictionary,
wherein the selection screen includes a button for registering with the dictionary, a button for registering with the on-hold list for holding the registration with the dictionary, and a button for not registering with the dictionary;

acquiring, from the terminal device, a selection result selected by the operator on the selection screen that is displayed on the terminal device;

when the button for registering with the dictionary is selected by the operator on the selection screen, registering the token in the dictionary with the two tokens in the token pair;

when the button for registering with the on-hold list is selected by the operator on the selection screen, generating the on-hold list and register the token in the on-hold list with the two tokens in the token pair; and when the button for not registering with the dictionary is selected by the operator on the selection screen, not registering the token in the dictionary with the two tokens in the token pair.

12. A non-transitory recording medium storing an analysis program executable a computer to perform processing comprising:

acquiring, from a terminal device operated by an operator, text data for generating a dictionary;

extracting, as a token pair, two tokens that consecutively occur in a sentence by using natural language processing based on a simple rule and a basic dictionary;

outputting, to the terminal device, a selection screen for selecting, regarding a token to which the two tokens included in the token pair are connected, any of:
registering with the dictionary,
registering with an on-hold list for holding registration with the dictionary, and
not registering with the dictionary,
wherein the selection screen includes a button for registering with the dictionary, a button for registering with the on-hold list for holding the registration with the dictionary, and a button for not registering with the dictionary;

acquiring, from the terminal device, a selection result selected by the operator on the selection screen that is displayed on the terminal device;

when the button for registering with the dictionary is selected by the operator on the selection screen, registering the token in the dictionary with the two tokens in the token pair;

when the button for registering with the on-hold list is selected by the operator on the selection screen, generating the on-hold list and register the token in the on-hold list with the two tokens in the token pair; and when the button for not registering with the dictionary is selected by the operator on the selection screen, not registering the token in the dictionary with the two tokens in the token pair.

* * * * *